Oct. 11, 1938.　　　　　C. BANCROFT　　　　　2,132,596
ROTARY DISPLACEMENT MEANS
Filed Jan. 29, 1938　　　　3 Sheets-Sheet 1
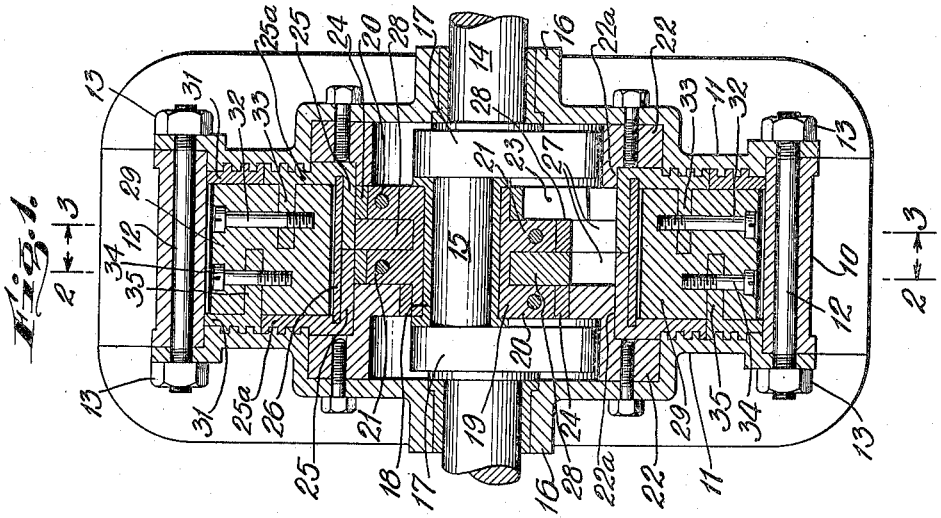
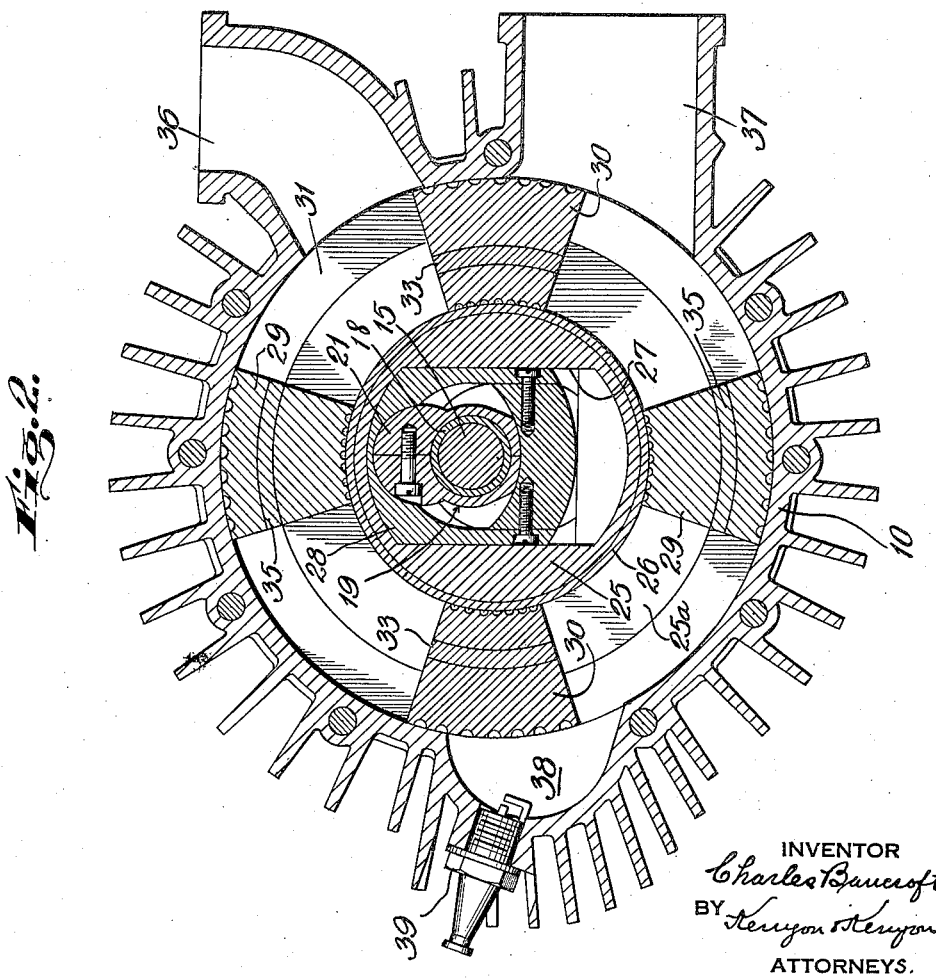
INVENTOR
Charles Bancroft
BY Kenyon & Kenyon
ATTORNEYS.

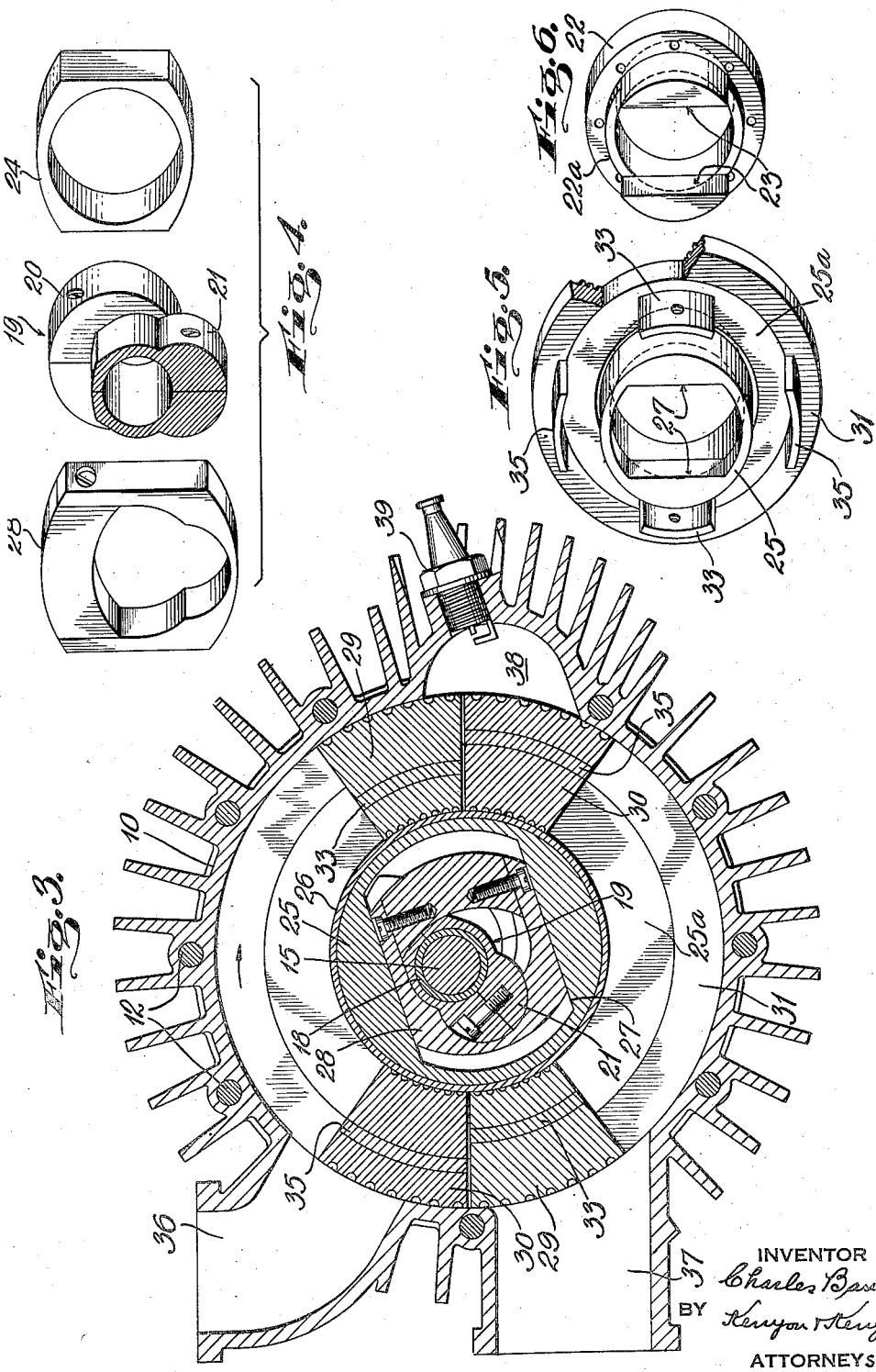

Oct. 11, 1938.  C. BANCROFT  2,132,596
ROTARY DISPLACEMENT MEANS
Filed Jan. 29, 1938  3 Sheets-Sheet 3
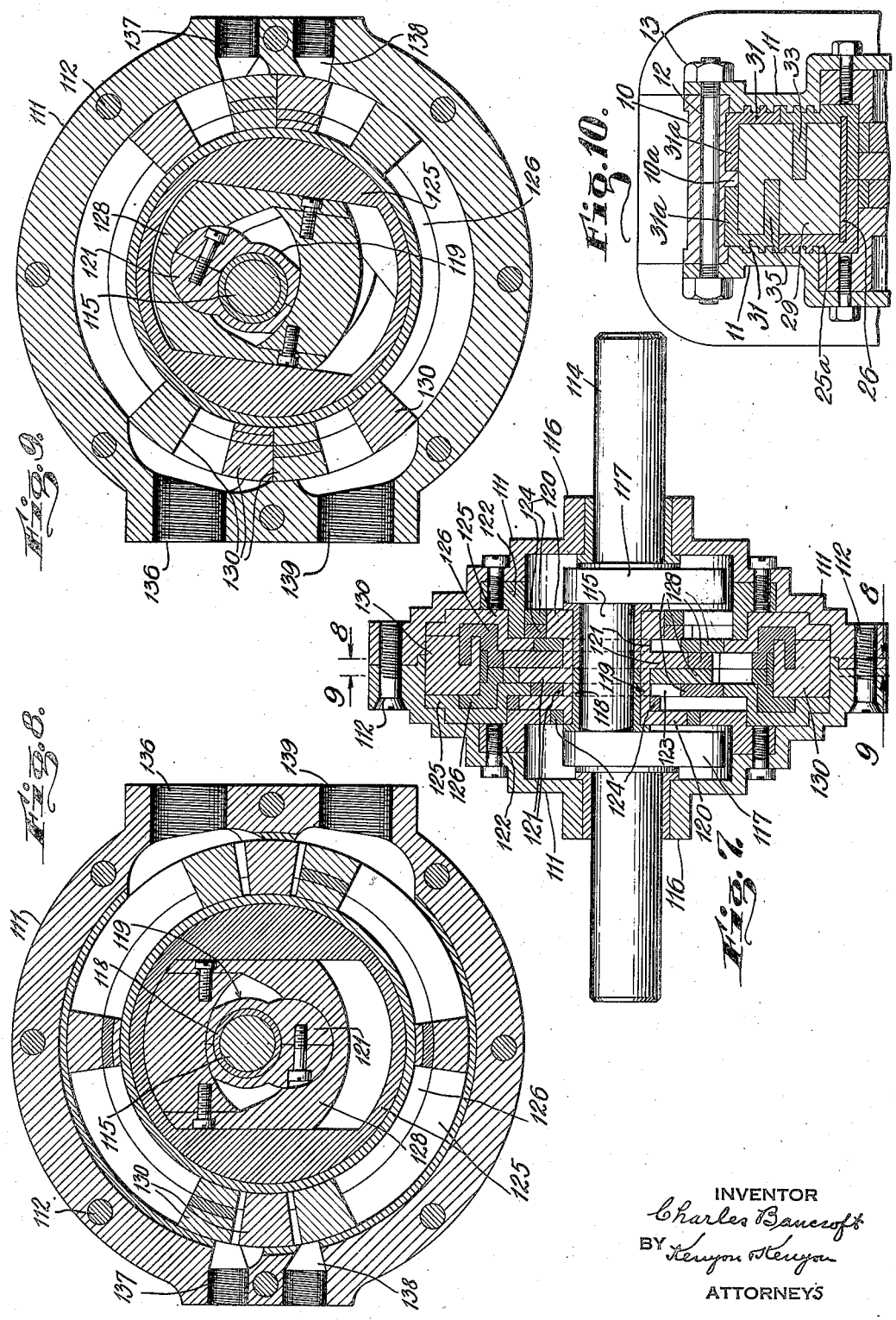
INVENTOR
Charles Bancroft
BY Kenyon & Kenyon
ATTORNEYS Patented Oct. 11, 1938

2,132,596

UNITED STATES PATENT OFFICE 2,132,596

ROTARY DISPLACEMENT MEANS

Charles Bancroft, New Canaan, Conn.

Application January 29, 1938, Serial No. 187,670

24 Claims. (Cl. 103—129)

This invention relates to rotary displacement means.

An object of this invention is a gearless rotary displacement device of the alternately accelerating piston type which is of simple construction, has no parts awkward to manufacture or assemble and in which the parts subject to acceleration stresses in operation are of less weight and size than in former displacement devices of this type.

A device embodying the invention has the feature that the fluids handled thereby are not brought into contact with a large area of stationary chamber as heretofore but instead the walls of the chamber are movable with the pistons, thus minimizing the temperature differences which occur between points of high and low pressure in such units. Also, the various elements may be compactly arranged within the confines of the piston path in such manner that the device is of but slightly greater width than the width of the piston chambers.

Other objects, novel features and advantages of this invention will become apparent from the following specification and accompanying drawings, wherein:

Fig. 1 is an axial section through an embodiment of the invention;

Fig. 2 is a section on the line 2—2 of Fig. 1;

Fig. 3 is a section on the line 3—3 of Fig. 1 with the crank shaft advanced 45°.

Fig. 4 is an exploded perspective view of a portion of the device;

Figs. 5 and 6 are perspective views of different parts of the device;

Fig. 7 is an axial section through a modified form of the invention;

Fig. 8 is a section on the line 8—8 of Fig. 7;

Fig. 9 is a section on the line 9—9 of Fig. 7 with the crank shaft advanced 22½°, and Fig. 10 is a fragmentary view similar to Fig. 1 of a modification.

Referring now to Figs. 1 to 6 in which the invention is disclosed as embodied in a displacement device having two sets of rotary pistons, a metal cylinder 10 is provided with end plates 11 to form a casing, the end plates being clamped to the cylinder by means of the bolts 12 and nuts 13. A crank shaft 14 having a crank pin 15 is journalled in hubs 16 extending from the plates 11 and is provided with the usual counterweights 17. A bushing 18 surrounds the crank pin 15 and constitutes a bearing for a rotatable member 19 provided with two sets of disks 20 eccentric to the crank pin to an extent equal to the crank throw radius and arcuate bearing pads 21 having their centers spaced from the crank pin axis in excess of the crank throw. One disk and associated bearing pad is shown in detail in Fig. 4, the remainder of the member 19 being omitted. In offsets provided in the end plates 11 are fixed annular members 22 (Fig. 6) and these members are provided with annular shoulders 22a concentric with the crank shaft, the end of each shoulder being shaped to form a rectilinear guideway 23 extending diametrically across the annular member. In each guideway 23 is provided a block 24 having an aperture in which is received an eccentric disk 20 and each block is limited to rectilinear movement by its associated guideway.

Cylindrical members 25 (Fig. 5) are rotatably mounted on the shoulders 22a with the adjacent edges in contact and each cylindrical member is provided with a flange 25a slidably engaging the inner face of an end plate 11. A cylindrical sealing band 26 overlies said cylindrical members 25. Each cylindrical member 25 is provided with a diametrically arranged rectilinear guideway 27 and in each guideway is slidably arranged a block 28 having an aperture enclosing the member 19 in alinement with a bearing pad 21, a portion of the aperture surface being of the proper curvature to journal a bearing pad 21, while the remainder of the aperture is of such size and shape as to permit limited relative rotary movement between the block 28 and the member 19 while preventing any relative rectilinear movement.

In the circular channel defined by the band 26 and flanges 25a are provided two pairs of pistons 29 and 30, one pair of pistons being fastened to one flange 25a and the other pair of pistons being connected to the other flange 25a. To each pair of pistons is fastened a ring 31 which snugly encloses a flange 25a and engages an end plate 11, thereby forming with the flanges 25a and cylinder 10 a ring cylinder. The pistons 29 and 30 are attached to the flanges 25a by means of bolts 32 in the pistons passing through lugs 33 extending from the flanges into the pistons while the rings 31 are attached to the pistons 29 and 30 by bolts 34 in the pistons passing through lugs 35 extending from the rings into the pistons.

Rotation of the crank shaft 14 causes movement of the axis of the member 19 through a circular orbit having the crank shaft axis as its center and the member 19 is caused to rotate twice about the axis of the crank pin or once with respect to the casing in the opposite direction to the direction of rotation of the crank shaft for each complete revolution of the crank shaft, such rotation being effected through the interaction of the rectilinearly movable blocks 24 and the eccentric disks 20. The cylindrical members 25 are rotated by the member 19 in the same direction with it but with continuous relative rotary movement between said cylindrical members. The relative rotary movement of the members 25 results from variation in the coupling leverage between the member 19 and cylindrical members 25 through the bearing pads 21 and blocks 24, such variation resulting from movement of the axis of member 19 through the orbit traversed by the crank pin with simultaneous rotation of the cylindrical members about the crank shaft axis, such coupling leverage variation being apparent from comparison of Figs. 2 and 3. The pistons 29 and 30 are moved relative to each other during rotation of the members 25 to cause variation in the spacing between adjacent ends of successive pistons thereby forming varying size chambers for the suction, compression and exhausting of fluids with respect to the stator or casing.

In the use of the displacement device above described as an internal combustion engine, an inlet 36 and outlet 37 are provided, together with a combustion chamber 38 in the wall of which is mounted a spark plug 39. Combustible gases are drawn in through the inlet 36 between the adjacent pistons, compressed as the pistons draw together and then transferred into the combustion chamber 38 as the trailing edge of the leading piston uncovers the entrance thereto. Immediately after the compressed gases have been transferred into this chamber, the leading edge of the leading piston closes off the gas exit from the combustion chamber. In the interval between the admission of the compressed gases into the combustion chamber and the closing off of the chamber, scavenging of the chamber of dead combustion gases is effected by the fresh charge. The charge of combustible gases in the combustion chamber is ignited and the combustion gases act as a wedge between the two adjacent pistons to force them apart and due to the ratio advantage the leading piston has over the following one, the combustion gas causes rotation of the shaft of the engine by forcing the pistons apart thus completing the cycle.

The disks 20 have been shown as oriented 180° from each other with a bearing pad 21 diametrically opposite each disk but other relationships of these elements may be made use of. Also, while the guideways 23 have been shown as being arranged at right angles to each other, other degrees of orientation of these guideways is contemplated. Any number of pairs of pistons greater than one may be used so long as the angular relationship each pair bears to its respective guideway 27 is such that when this angular relationship equals zero degrees between one set of pistons and its guideway, the remaining pairs have an angular relationship in degrees equal to plus and minus 180 divided by the number of pairs of pistons and plus and minus twice this number of degrees and so on until each pair of pistons has had determined its angular relationship with its respective guideway 27.

The rings 31 serve as part of the walls of the chamber in which the pistons rotate and assist in the location of the pistons with respect to each other and other parts of the device and more readily act to neutralize or balance out any tendency there may be for pressure in the spaces between pistons to move apart the cylindrical members 25 and place undue loads on the bearings therefor. To assist in this purpose, the lateral area of the rings exposed to said pressure is so chosen as to be substantially equal to the area of the flanges 25a exposed to such pressure in the opposite direction. Also, the provision of moving side walls for the ring cylinder minimizes temperature differences between points of high and low pressure.

In Figs. 7 to 10 inclusive is disclosed a modified form of the invention which contains four sets of pistons. The casing or stator is composed of two plates 111 fastened together by bolts 112. A crank shaft 114 having a crank pin 115 is mounted in hubs 116 in the plates 111. The crank shaft is provided with the usual counterweights 117 and a bushing 118 on the crank pin constitutes a bearing for a rotatable member 119 provided with four eccentric disks 120, two at one end and two at the other, the two disks at each end being oriented 180° from each other and also provided between the two pairs of disks with four bearing pads 121 which are successively oriented 90° from each other. An annular member 122 is fixed to each end plate concentric with the crank shaft and has two diametrically arranged guideways 123 at right angles to each other in which are provided slidable blocks 124 having apertures receiving the eccentric disks 120.

Cylindrical members 125 are rotatably mounted on the annular members 122 and cylindrical members 126 are rotatably mounted on the cylindrical members 125. Each of these cylindrical members has a diametrically arranged guideway in which is slidably mounted a block 128 in alinement with a bearing pad 121, the block having an aperture enclosing the member 119, a portion of the aperture surface being of the proper curvature to journal the bearing pad while the remainder of the aperture is of such size and shape as to permit limited relative rotary movement between the block 128 and the member 119 while preventing any relative rectilinear movement. The cylindrical members 125 and 126 are provided with flanges which co-operate to form an annular channel, the flanges of the members 125 constituting the upper half of the side walls of the channel and the flanges of the members 126 constituting the lower half of the side walls of such channel. In the channel just described are arranged four pairs of pistons 130, each pair of pistons being connected to one of the cylindrical members 125 and 126.

Rotation of the crank shaft 114 causes rotary movement of the pistons in the opposite direction at varying speeds between a maximum and a minimum as previously described so that the adjacent faces of successive pistons continuously move toward and away from each other to form chambers of varying capacity.

One use of the apparatus above described is as a combination motor and compressor. When so used, expansible fluid is introduced through the inlet port 137 and discharged through the outlet 136 and acts upon the pistons to cause rotation thereof. The rotary movement of the pistons is then used to draw in the fluid to be compressed through the inlet 139 and carry such fluid over to and discharge the same through the outlet 138.

In the modification illustrated in Fig. 10, the rings 31 are provided with flanges 31a extending inwardly toward each other and engaging the outer surfaces of the pistons. The inner ends of the flanges are sufficiently spaced to permit the passage of fluid into and out of the chambers defined by adjacent pairs of successive pistons through the inlet and outlet ports which are shaped to conform to the spacing between the flanges. Except at the ports a shoulder 10a extends between the edges of the flanges.

I claim:

1. An apparatus of the character described comprising a crank shaft having a crank pin, rotatable cylindrical members coaxial with said crank shaft and having radial rectilinear guideways, a pair of pistons connected to each cylindrical member, an annular chamber housing said pistons and having inlet and outlet ports, a connecting member rotatably mounted on said crank pin and provided with an arcuate bearing pad for each cylindrical member, means for effecting rotation of said connecting member twice about the crank pin for each rotation of the crank shaft counter to the direction of rotation of said crank shaft, and a block slidably associated with each guideway in alinement with each bearing pad and having an aperture surrounding said connecting member, a portion of the aperture surface being of proper curvature to journal the bearing pad and the remainder of the aperture being of such size and shape as to permit limited relative rotary movement between said block and connecting member while preventing relative rectilinear movement thereof.

2. An apparatus of the character described comprising a crank shaft having a crank pin, rotatable cylindrical members coaxial with said crank shaft and having radial rectilinear guideways, a pair of pistons connected to each cylindrical member, an annular chamber housing said pistons and having inlet and outlet ports, a connecting member rotatably mounted on said crank pin and provided with an arcuate bearing pad for each cylindrical member, means for effecting rotation of said connecting member on the crank pin, said means comprising eccentric disks forming part of said connecting member and rectilinearly movable bearings for said disks, and a block slidably associated with each guideway in alinement with each bearing pad and having an aperture surrounding said connecting member, a portion of the aperture surface being of proper curvature to journal the bearing pad and the remainder of the aperture being of such size and shape as to permit limited relative rotary movement between said block and connecting member while preventing relative rectilinear movement thereof.

3. An apparatus of the character described comprising a crank shaft having a crank pin, rotatable cylindrical members coaxial with said crank shaft and having radial rectilinear guideways, a pair of pistons connected to each cylindrical member, an annular chamber housing said pistons and having inlet and outlet ports, a connecting member rotatably mounted on said crank pin and provided with an arcuate bearing pad for each cylindrical member and eccentric circular means, means to guide said circular means bodily back and forth along a rectilinear path, and a block slidably associated with each guideway in alinement with each bearing pad and having an aperture surrounding said connecting member, a portion of the aperture surface being of proper curvature to journal the bearing pad and the remainder of the aperture being of such size and shape as to permit limited relative rotary movement between said block and connecting member while preventing relative rectilinear movement thereof.

4. In an apparatus of the character described, a crank shaft having a crank pin, rotatable members coaxial with said crank shaft, a pair of pistons carried by each rotatable member, an annular chamber housing said pistons and having inlet and outlet ports, circular means rotatably mounted on said crank pin eccentrically thereof, means to guide said circular means bodily back and forth along a rectilinear path, and interconnections between said circular means and said rotatable members for rotating the latter by the former with alternate acceleration and deceleration of said pairs of pistons.

5. An apparatus of the character described comprising a crank shaft having a crank pin, a connecting member rotatably mounted on said crank pin, means for effecting rotation of said connecting member twice about said crank pin opposite to the direction of rotation of said crank shaft for each rotation of the crank shaft, rotatable members coaxial with said crank shaft and having radial rectilinear guideways, a block slidable in each guideway, means pivotally connecting each block to said connecting member, flanges on said rotatable members defining a channel, a pair of pistons connected to each flange, a ring surrounding each flange and connected to one of said pairs of pistons, an annular chamber surrounding said pistons having its side walls composed of said flanges and rings, and inlet and outlet ports for said chamber.

6. Apparatus of the character described comprising a crank shaft having a crank pin, rotatable members coaxial with said crank shaft, flanges on said members defining a channel, pairs of pistons arranged in said channel, connections between each pair of pistons and a flange, a ring surrounding each flange and connected to one of said pairs of pistons, an annular chamber surrounding said pistons having its side walls composed of said flanges and rings, inlet and outlet ports for said chamber, and means connecting said rotatable members to said crank shaft for effecting rotation of said members counter to the crank shaft with alternate acceleration and deceleration of said members.

7. Apparatus of the character described comprising a crank shaft having a crank pin, a pair of rotatable members coaxial with said crank shaft, an outwardly extending flange on each rotatable member, a ring surrounding each flange, a pair of pistons connected to each flange and the ring associated with the remaining flange, an annular chamber housing said pistons having its side walls composed of said flanges and rings, inlet and outlet ports for said chamber, and means connecting said rotatable members to said crank shaft for effecting rotation of said members counter to the crank shaft with alternate acceleration and deceleration of said members.

8. Apparatus of the character described comprising a crank shaft having a crank pin, a pair of rotatable cylindrical members coaxial with said crank shaft and having radial rectilinear guideways, a flange extending outwardly from each cylindrical member, a ring surrounding each flange, a pair of pistons connected to each flange and the ring associated with the remaining flange, an annular chamber surrounding said pistons having its side walls composed of said flanges and rings, inlet and outlet ports for said chamber, a connecting member rotatably mounted on said crank pin and provided with an arcuate bearing pad for each cylindrical member and an eccentric disk, means to guide said disk bodily back and forth along a rectilinear path, and a block slidably associated with each guideway in alinement with each bearing pad and having an aperture surrounding said connecting member, a portion of the aperture surface being of proper curvature to journal the bearing pad and the remainder of the aperture being of such size and shape as to permit limited relative rotary movement between said block and connecting member while preventing relative rectilinear movement thereof.

9. Apparatus of the character described comprising a crank shaft having a crank pin, a connecting member rotatably mounted on said crank pin, means for effecting rotation of said connecting member twice about said crank pin opposite to the direction of rotation of said crank shaft for each rotation of the crank shaft, a pair of cylindrical members coaxial with said crank shaft and having radial rectilinear guideways, a block slidable in each guideway, means pivotally connecting each block to said connecting member, an outwardly extending flange on each cylindrical member, a ring surrounding each flange, a pair of pistons connected to each flange and the ring associated with the remaining flange, an annular chamber surrounding said pistons having its side walls composed of said flanges and rings, and inlet and outlet ports for said chamber.

10. Apparatus of the character described comprising a crank shaft having a crank pin, a pair of rotatable cylindrical members coaxial with said crank shaft and having radial rectilinear guideways, a flange extending outwardly from each cylindrical member, a ring surrounding each flange, a pair of pistons connected to each flange and the ring associated with the remaining flange, an annular chamber housing said pistons having its side walls composed of said flanges and rings, inlet and outlet ports for said chamber, a connecting member rotatably mounted on said crank pin and provided with an arcuate bearing pad for each cylindrical member, means for effecting rotation of said connecting member twice about the crank pin for each rotation of the crank shaft counter to the direction of rotation of said crank shaft, and a block slidably associated with each guideway in alinement with each bearing pad and having an aperture surrounding said connecting member, a portion of the aperture surface being of proper curvature to journal the bearing pad and the remainder of the aperture being of such size and shape as to permit limited relative rotary movement between said block and connecting member while preventing relative rectilinear movement thereof.

11. An apparatus of the character described comprising a crank shaft having a crank pin, rotatable cylindrical members coaxial with said crank shaft and having rectilinear guideways, flanges on said cylindrical members, a pair of pistons connected to each flange, a ring surrounding each flange and connected to one of said pairs of pistons, an annular chamber surrounding said pistons having its side walls composed of said flanges and rings, inlet and outlet ports for said chamber, a connecting member rotatably mounted on said crank pin and provided with an arcuate bearing pad for each cylindrical member, means for effecting rotation of said connecting member twice about the crank pin for each rotation of the crank shaft counter to the direction of rotation of said crank shaft, and a block slidably associated with each guideway in alinement with each bearing pad and having an aperture surrounding said connecting member, a portion of the apertured surface being of proper curvature to journal the bearing pad and the remainder of the aperture being of such size and shape as to permit limited relative rotary movement between said block and bearing pad while preventing relative rectilinear movement thereof.

12. An apparatus of the character described comprising a crank shaft having a crank pin, rotatable cylindrical members coaxial with said crank shaft and having radial rectilinear guideways, flanges on said cylindrical members, a pair of pistons connected to each flange, a ring surrounding each flange and connected to one of said pairs of pistons, an annular chamber surrounding said pistons having its side walls composed of said flanges and rings, inlet and outlet ports for said chamber, a connecting member rotatably mounted on said crank pin and provided with an arcuate bearing pad for each cylindrical member, means for effecting rotation of said connecting member on the crank pin, said means comprising eccentric disks forming part of said connecting member and rectilinearly movable bearings for said disks, and a block slidably associated with each guideway in alinement with each bearing pad and having an aperture surrounding said connecting member, a portion of the aperture surface being of proper curvature to journal the bearing pad and the remainder of the aperture being of such size and shape as to permit limited relative rotary movement between said block and connecting member while preventing relative rectilinear movement thereof.

13. A device of the character described including in combination, a hollow cylindrical stator including an annular chamber having inlet and outlet ports, two or more sets of pistons rotatably mounted in said stator for movement in said chamber and capable of a certain amount of rotation independently of each other as well as rotation in said stator as a group and means for alternately speeding and slowing each set of pistons to vary the spacing between adjacent pistons, said means including a crank shaft having a crank pin, a connecting member rotatably mounted on said crank pin and provided with an eccentric disk, and means to guide said disk back and forth along a rectilinear path for effecting rotation of said connecting member twice about the crank pin for each rotation of the crank shaft and counter to the direction of rotation of said crank shaft.

14. A device of the character described including in combination, a stator including an annular chamber having inlet and outlet ports, a shaft therein, pistons rotatably mounted in said stator for movement in said chamber coaxial with said shaft, said shaft having a crank member, a connecting member on said crank member, combined eccentric and reciprocating means for effecting rotation of said connecting member on said crank member, and means connecting said connecting member and said pistons for alternately speeding and slowing of said pistons.

15. A device of the character described including in combination, a stator including an annular chamber having inlet and outlet ports, a shaft therein, pistons rotatably mounted in said stator for movement in said chamber coaxial with said shaft, said shaft having a crank member, a connecting member on said crank member, combined eccentric and reciprocating means for effecting rotation of said connecting member on said crank member; said crank shaft, connecting member, and means for effecting rotation of said connecting member comprising means of alternately accelerating and decelerating individual sets of pistons.

16. An apparatus of the character described, in combination, a stator including an annular chamber having inlet and outlet ports, a shaft having a crank pin rotatably mounted in said stator, sets of pistons rotatably mounted in said stator for movement in said chamber and means for controlling the rotation of said sets of pistons so as to cause alternate acceleration and deceleration of said pistons during the rotation thereof in said stator, said means including a member rotatably mounted on said crank pin and combined eccentric and reciprocating means for rotating said member in the opposite direction to said shaft.

17. An apparatus of the character described, in combination, a stator including an annular chamber having inlet and outlet ports, a shaft having a crank pin rotatably mounted in said stator, sets of pistons rotatably mounted in said stator for movement in said chamber and means for controlling the rotation of said sets of pistons so as to cause alternate acceleration and deceleration of said pistons during the rotation thereof in said stator, said means including a member rotatably mounted on said crank pin and combined eccentric and reciprocating means for rotating said member in opposite direction to said shaft, said eccentric and reciprocating means including an eccentric disk attached to said member and a slidable block supported by said stator with said eccentric disk borne in said slidable block.

18. Apparatus of the character described comprising a crank shaft having a crank pin, a disk rotatably mounted on said crank pin eccentrically thereof, means for limiting said disk to bodily reciprocating movement, a pair of rotatable members coaxial with said crank shaft, a pair of blocks, radial guide means on one rotatable member engageable by one of said blocks, radial guide means on the remaining rotatable member engaged by the remaining block, means pivotally connecting said blocks to said disk at equal distances from the crank pin axis and in alinement therewith, a pair of pistons connected to each rotatable member, an annular chamber housing said pistons and inlet and outlet ports therefor.

19. Apparatus of the character described, comprising a crank shaft having a crank pin, a disk rotatably mounted on said crank pin eccentrically thereof, a reciprocating member having an aperture in which said disk is journalled, a pair of rotatable members coaxial with said crank shaft, a pair of blocks, radial guide means on one rotatable member engaged by one of said blocks, radial guide means on the remaining rotatable member engaged by the remaining block, means pivotally connecting said blocks to said disk at equal distances from the crank pin axis and in alinement therewith, a pair of pistons connected to each rotatable member, an annular chamber housing said pistons, and inlet and outlet ports for said chamber.

20. Apparatus of the character described comprising a crank shaft having a crank pin, a disk rotatably mounted on said crank pin eccentrically thereof, means for limiting said disk to bodily reciprocating movement, a pair of rotatable members coaxial with said crank shaft, each rotatable member having a circular portion coaxial with said crank shaft, a radial guideway on each circular portion, blocks engaging said guideways, and means pivotally connecting said blocks to said disk, a pair of pistons connected to each rotatable member, an annular chamber housing said pistons and inlet and outlet ports therefor.

21. Apparatus of the character described comprising a crank shaft having a crank pin, a plurality of disks rotatably mounted on said crank pin eccentrically thereof and oriented relative to each other, bearings in which said disks are journalled, means confining said bearings to linear reciprocating motion, a pair of rotatable members coaxial with said crank shaft, a pair of blocks, radial guide means on one rotatable member engaged by one of said blocks, radial guide means on the remaining rotatable member engaged by the remaining block, means pivotally connecting said blocks to said disks at equal distances from the crank pin axis and in alinement therewith, a pair of pistons connected to each rotatable member, an annular chamber housing said pistons and inlet and outlet ports for said chamber.

22. In an apparatus of the character described, a crank shaft having a crank pin, rotatable members coaxial with said crank shaft, flanges on said members defining a channel, pairs of pistons arranged in said channel, an annular chamber housing said pistons and having its side walls composed in part of said flanges, inlet and outlet ports for said chamber connections between each pair of pistons and one flange, circular means rotatably mounted on said crank pin eccentrically thereof, means to guide said circular means bodily back and forth along a rectilinear path, and interconnections between said circular means and said rotatable members for rotating the latter by the former with alternate acceleration and deceleration of said pairs of pistons.

23. In an apparatus of the character described, a crank shaft having a crank pin, rotatable members coaxial with said crank shaft, flanges on said members defining a channel, a pair of pistons connected to each flange, a ring surrounding each flange and connected to one of said pairs of pistons, an annular chamber housing said pistons and having its side walls composed of said flanges and rings, inlet and outlet ports for said chamber, circular means rotatably mounted on said crank pin eccentrically thereof, means to guide said circular means bodily back and forth along a rectilinear path, and interconnections between said circular means and said rotatable members for rotating the latter by the former with alternate acceleration and deceleration of said pairs of pistons.

24. Apparatus according to claim 6 in which a cylindrical band coaxial with said crank shaft extends between said flanges to constitute the inner wall of said annular chamber housing the pistons.

CHARLES BANCROFT.